United States Patent [19]

Harris

[11] 4,218,628
[45] Aug. 19, 1980

[54] VACUUM ULTRAVIOLET AND X-RAY LIGHT SOURCE AND METHOD AND SHORT WAVELENGTH LASER PUMPED BY SAID LIGHT SOURCE

[75] Inventor: Stephen E. Harris, Palo Alto, Calif.

[73] Assignee: The Board of Trustees of the Leland Stanford Junior University, Stanford, Calif.

[21] Appl. No.: 41,778

[22] Filed: May 23, 1979

Related U.S. Application Data

[63] Continuation-in-part of Ser. No. 840,000, Oct. 6, 1977, abandoned.

[51] Int. Cl.² ............................................. H03F 7/00
[52] U.S. Cl. .............................. 307/426; 331/94.5 R
[58] Field of Search .................. 307/426, 425, 424; 331/94.5 G, 94.5 L, 94.5 R

[56] References Cited

PUBLICATIONS

Brauhlich et al., "Physical Review Letters," 25, 15(1970), pp. 135–138.
Mahr et al., "Optical Comm.," 10, 227(1976).
Mani et al., "J. Applied Physics," 47, 3099(1976).
Hyman et al., "Optical Comm.," 20, 201(1977).
Vekhov et al., "Sov. J. Quant. Elect.," 5 718(Jun. 1975).
Nelson et al., "J. Chem. Phys.," 55, 5127(Nov. 1971).
Vinogradov et al., "Sov. J. Quant. Elect.," 3 No. 2, Sep.–Oct. 1973.
Duguay et al., "Applied Physics Letters," vol. 10, No. 12, (Jun. 15, 1967).

Primary Examiner—Rudolph V. Rolinec
Assistant Examiner—Darwin R. Hostetter

[57] ABSTRACT

A vacuum ultraviolet and x-ray light source based on spontaneous anti-Stokes scattering from atomic population stored in a metastable level is described. The source has a maximum brightness, attained as the media approaches two-photon opacity, equal to that of a blackbody at a Boltzmann temperature characteristic of the population of the metastable level. The source may have high resolution, picosecond time scale, and on a pulsed basis is brighter than other laboratory vacuum ultraviolet light sources. Short wavelength lasers pumped by said source are also described. The lasing atomic species can be separate from or combined in the same envelope with the light source atomic species. Use of the source for spectrographic applications is also described.

31 Claims, 13 Drawing Figures

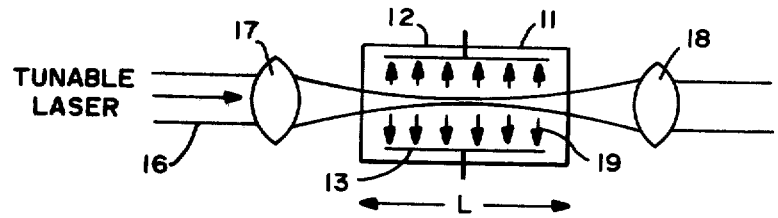
FIG.—1
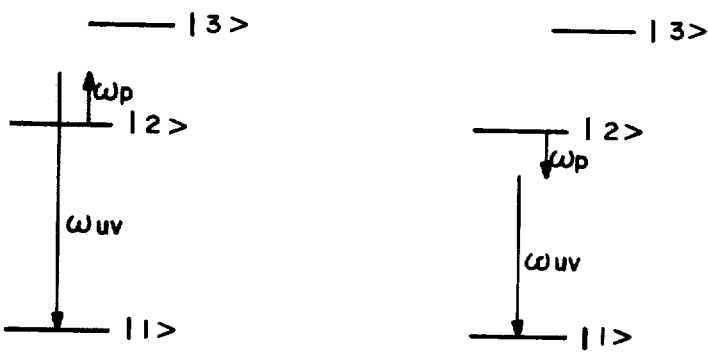
FIG.—2  FIG.—3
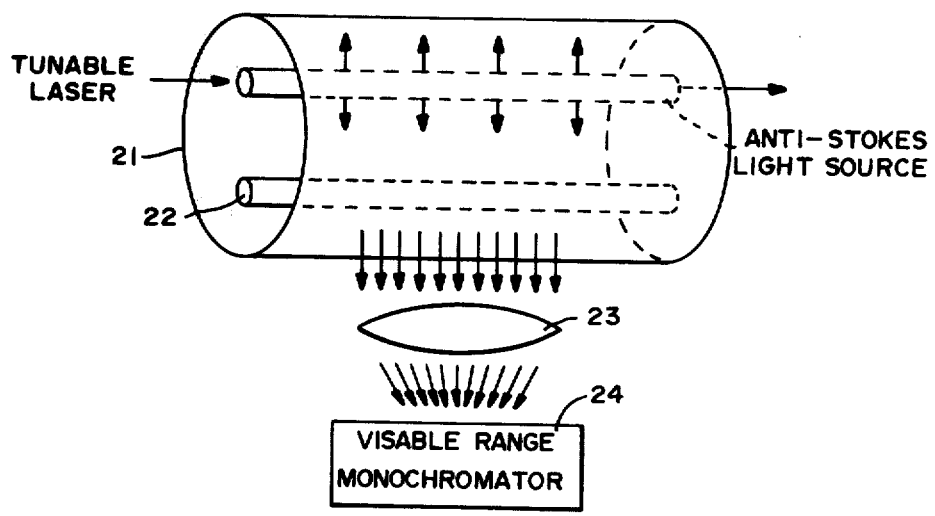
FIG.—4

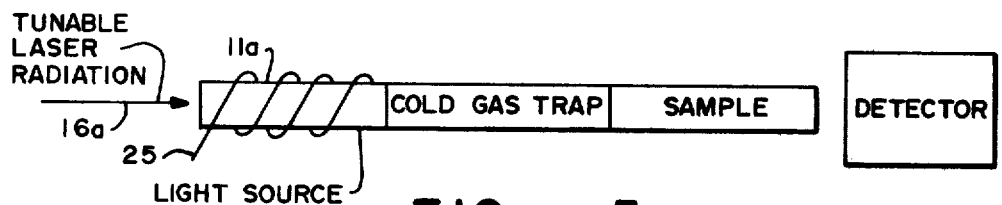
FIG.—5
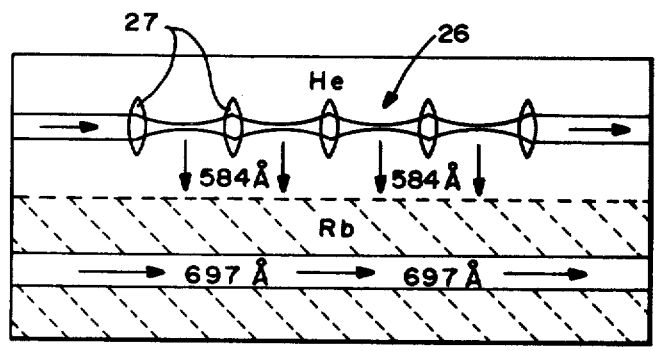
FIG.—6
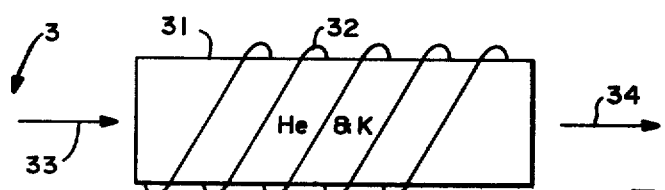
FIG.—7
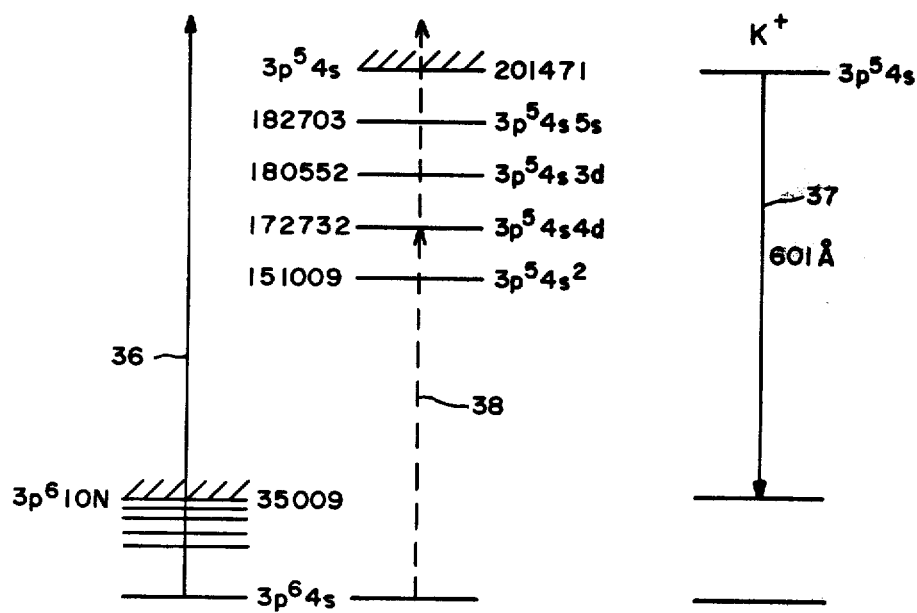
FIG.—8

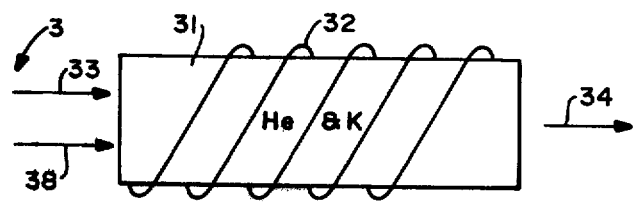
FIG.—9
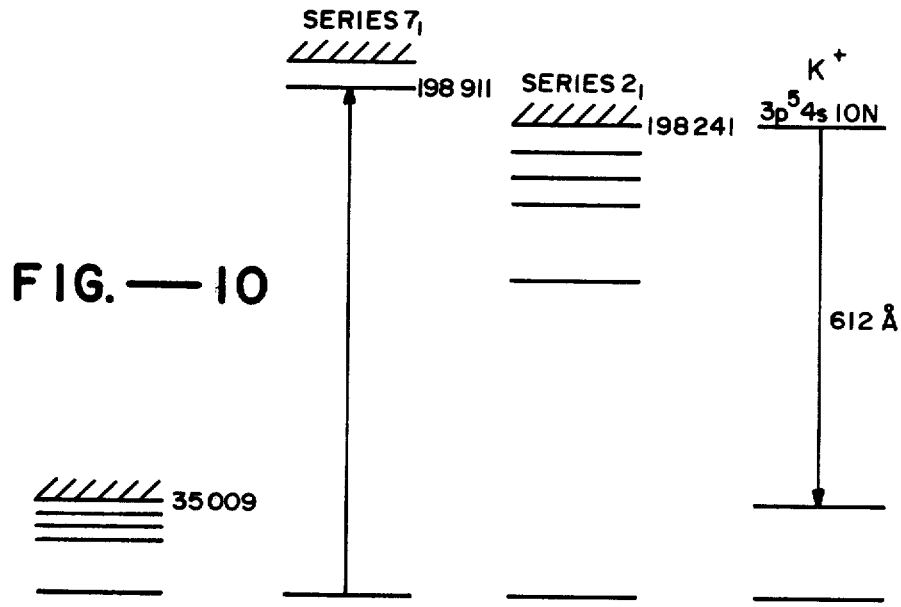
FIG.—10
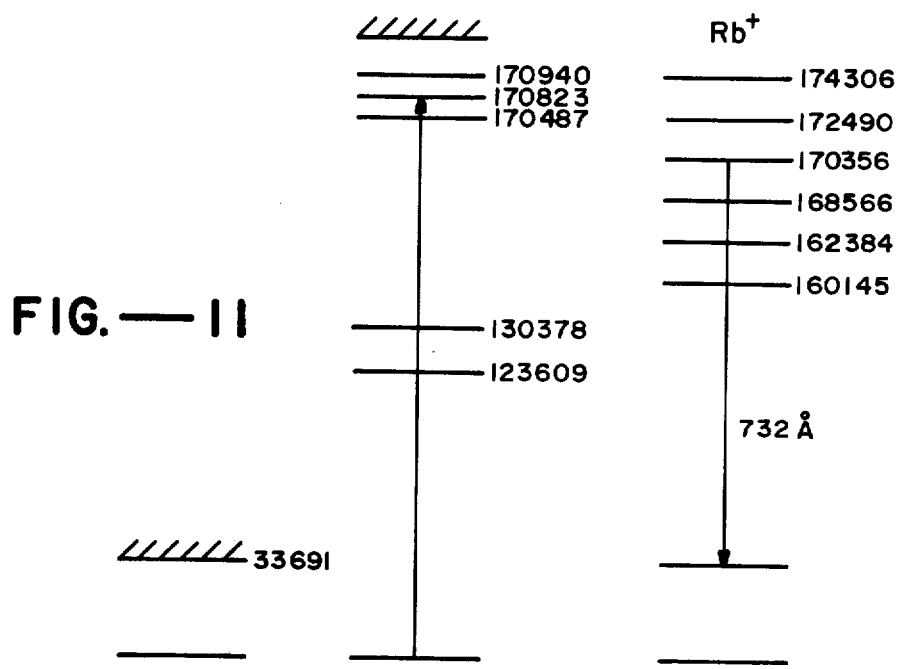
FIG.—11

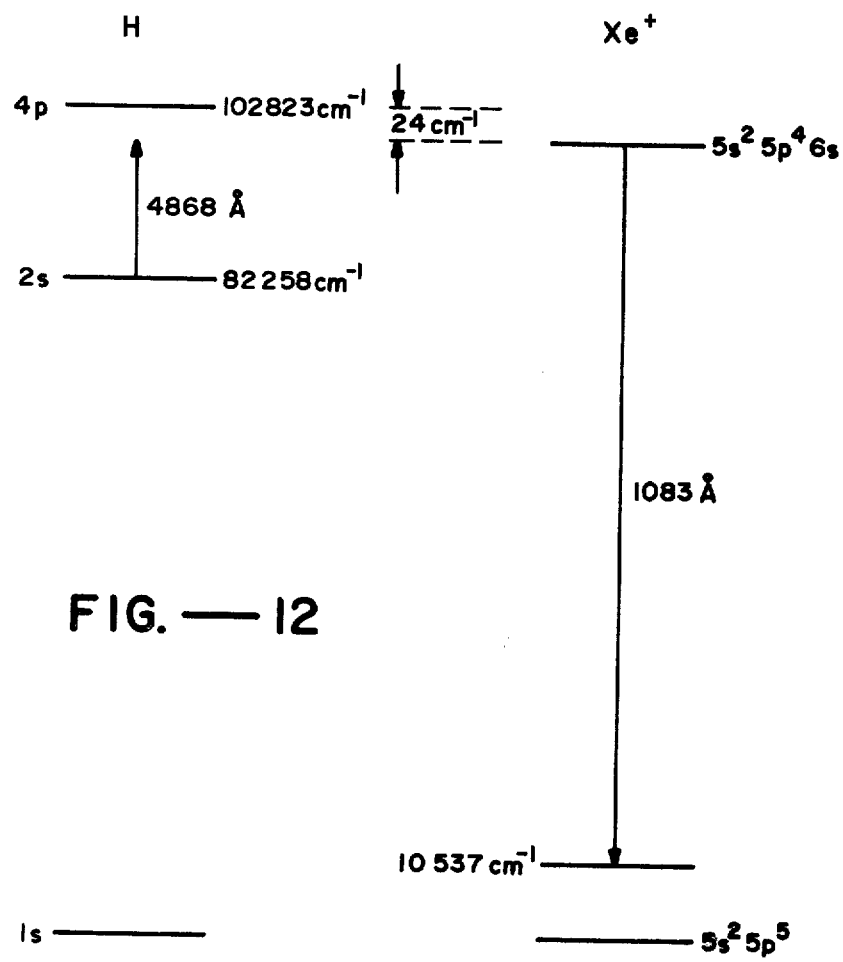
FIG.—12
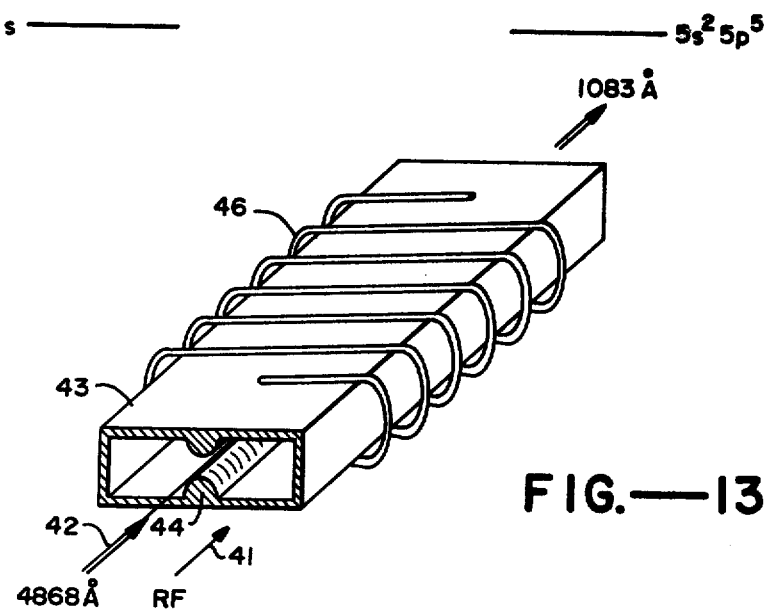
FIG.—13

VACUUM ULTRAVIOLET AND X-RAY LIGHT SOURCE AND METHOD AND SHORT WAVELENGTH LASER PUMPED BY SAID LIGHT SOURCE

GOVERNMENT CONTRACTS

The U.S. Government has rights to this patent pursuant to Advanced Research Projects Agency Contract No. N00014-75-C-1175.

The support of the Advanced Research Projects Agency and the Guggenheim Foundation is gratefully acknowledged.

RELATED APPLICATION

This application is a continuation-in-part of a pending application Ser. No. 840,000 filed Oct. 6, 1977 entitled Vacuum Ultraviolet and Soft X-Ray Light Source and Method, now abandoned.

BACKGROUND OF THE INVENTION

This invention relates generally to a light source and more particularly to a vacuum ultraviolet and x-ray light source and to a short wavelength laser pumped by said light source.

The source of vacuum ultraviolet and soft x-ray radiation now in use include the hydrogen glow discharge, rare gas continua, hot plasma sources such as the duoplasmatron and the laser produced plasma, and the synchrotron. The hydrogen glow discharge in conjunction with a LiF window is most effective at wavelengths longer than about 1200 Å. The rare gas continua are perhaps most effective in the spectral region between 500 Å and 1200 Å. At still shorter wavelengths, for example, between 80 Å and 500 Å, the radiation from low pressure sparks, for example, the BRV spark source, is used. Of perhaps most importance the synchrotron provides a source of calibrated, relatively well collimated radiation, useful to the region of at least several angstroms.

The radiation from all of the above light sources covers a wide spectral range. Often it is a continuum of several hundred angstroms in width, while in other cases it consists of a large number of discrete spectral lines characteristic of the media. For most, or at least many, spectroscopic and photochemical applications it is thus necessary to first pass the radiation through a monochromator or spectrometer. With the exception of the synchrotron, the above light sources all emit into $4\pi$ steradians. Due to the restricted angular acceptance and relatively poor reflectivity of vacuum ultraviolet spectrometers, an intensity loss of greater than four orders of magnitude is often experienced when using a combination of light source and spectrometer.

The length of their emission in time (pulse duration) is controlled by electrical parameters and thus light sources with a pulse duration of less than about one-half nanosecond, useful in the measurement of fluorescence, are generally not obtainable.

There has recently been considerable interest in the possibility of constructing vacuum ultraviolet and soft x-ray lasers by the technique of first inverting the population of a metastable species with respect to ground, and then extracting the inverted population by applying an intense laser pulse tuned to the upper level of the resonance transition. However, the operation of vacuum ultraviolet laser sources of this type await the prior development of methods of accomplishing the inversion of the metastable species with respect to ground. Referring to FIG. 2, inversion means that there are more atoms in level 2 than in level 1. The construction of x-ray lasers using metastable levels of atomic species is described by H. Mahr and U. Roeder, Opt. Commun. 10, 227 (1974); S. A. Mani, H. A. Hyman, and J. D. Daugherty, J. Appl. Phys. 47, 3099 (1976); and H. A. Hyman and S. A. Mani, Opt. Commun. 20, 209 (1977).

The generation of radiation at a wavelength of 199 Å by first exciting and storing populations in a metastable level and then transferring energy to another level from which it then radiates to ground is described by A. A. Vekhov, V. N. Makhov, F. A. Nikolaev, and V. B. Rozanov in the paper entitled "Possibility of Using Metastable Helium Like Ions in Generation of Ultrasoft X-Ray Stimulated Radiation," Sov. J. Quant. Elect. 5, 718 (June 1975). The paper describes an experiment where decaying plasma produces metastable storage in the $1s2s^3S$ and $1s2s^1S$ states of lithium II. Radiation from a xenon pulsed discharge lamp at about 9620 Å was used to transfer this population from these states, level 2, to the 1s2sP state, level 3, which then radiated to ground at the wavelength of 199 Å, the radiated energy being radiated by a fluorescent process.

The present invention is based upon the realization that vacuum ultraviolet light may be obtained by excitation of populations in metastable levels and the subsequent extraction of energy from these levels by spontaneous anti-Stokes scattering. The phenomena has been known for many years, and has often been used for diagnostic applications. For example, L. Y. Nelson, A. W. Saunders, Jr., A. B. Harvey, and G. O. Neely, "Detection of Vibrationally Excited Homonuclear Diatomic Molecules by Raman Spectroscopy," J. Chem. Phys. 55, 5127 (Nov. 1971) shows the use of both Stokes and anti-Stokes emission for studying vibrationally hot nitrogen molecules produced in an electrical discharge. In the above experiment radiation is observed at the sum frequency of the vibrational storage level in nitrogen at about 2330 cm$^{-1}$ and the incident laser frequency of 4800 Å. Anti-Stokes emission has also been used as a spectroscopic tool to study populations of many thermally excited organic species.

P. Braunlich, R. Hall, and P. Lambropoulos, "Laser-Induced Quenching of Metastable Deuterium Atoms. Singly Stimulated Two-Photon Emission and Anti-Stokes Raman Scattering, "Phys. Rev. A 5, No. 3 (Mar. 1972), describe the use of a collimated beam of deuterium metastable atoms excited by a laser to induce two-photon and anti-Stokes scattering in the vacuum ultraviolet region of the spectrum. The density of the atoms in the beam is low and the radiation is weak.

OBJECTS AND SUMMARY OF THE INVENTION

It is a general object of the present invention to provide an improved source of vacuum ultraviolet and x-ray radiation.

It is another object of the present invention to provide a method of generating high intensity ultraviolet radiation.

It is another object of this invention to provide a source of sufficiently narrowband vacuum ultraviolet and soft x-ray radiation, that the use of a monochromator or spectrometer is not necessary.

It is another object of the present invention to provide a method of generating vacuum ultraviolet incoherent radiation by bulk excitation of a large population in a metastable level at an energy characteristic of the radiation and the subsequent extraction of this energy by the anti-Stokes radiation process.

It is another object of the present invention to provide a tunable, narrow linewidth short pulsewidth incoherent source of vacuum ultraviolet and soft x-ray radiation and method.

It is a further object of the present invention to provide a small size source of high brightness vacuum ultraviolet radiation and method.

It is another object of the present invention to provide a source of vacuum ultraviolet and x-ray radiation including a source of population of atomic species in a metastable level at an energy characteristic of the frequency of radiation and laser means for introducing energy at a different frequency to cause spontaneous anti-Stokes scattering.

It is another object of the present invention to provide a short wavelength laser which is pumped by the radiation from a source of vacuum ultraviolet and x-ray radiation in accordance with the present invention.

It is a further object of the present invention to provide a short wavelength laser including a lasing atomic species which is pumped by a source of vacuum ultraviolet and x-ray radiation including a population of atomic species in a metastable level at an energy characteristic of the radiation frequency and laser means for introducing energy at a different frequency to cause spontaneous scattering in which the lasing species is in a separate envelope from the radiation source atomic species.

It is a further object of the present invention to provide a short wavelength laser including a lasing atomic species which is pumped by a source of vacuum ultraviolet and x-ray radiation including a population of atomic species in a metastable level at an energy characteristic of the radiation frequency and laser means for introducing energy at a different frequency to cause spontaneous scattering in which the lasing atomic species is intermixed in the same envelope with the radiation source atomic species.

It is another object of the present invention to provide a short wavelength laser which includes a lasing atomic species pumped from a source of vacuum ultraviolet and x-ray radiation in accordance with the present invention and by at least an additional source of energy.

The foregoing and other objects of the invention are achieved in a vacuum ultraviolet source in which energy is stored in an atomic population at a metastable level in a radiating medium at a first frequency and a laser introduces energy into said medium at a second frequency to cause spontaneous anti-Stokes scattering from the atomic population in said metastable level at a frequency equal to the sum and difference of said first frequency and second frequency.

BRIEF DESCRIPTION OF FIGURES

FIG. 1 shows a light source in accordance with the invention.

FIGS. 2 and 3 are energy level diagrams illustrating the frequency of the generated light.

FIG. 4 shows a monochromator employing an elliptical reflector and reflector and a light source in accordance with the invention.

FIG. 5 shows a light source in accordance with the invention in another configuration for spectrographic application.

FIG. 6 shows a light source in accordance with the present invention employed as a laser pump.

FIG. 7 shows a laser in which the light source atomic species and the lasing atomic species are mixed in the same envelope.

FIG. 8 shows the atomic processes for lasers which operate by direct photoionization into the continuum employing single-photon or two-photon photoionization.

FIG. 9 shows a mixed atomic species laser of the type shown in FIG. 7 with a laser source providing a second photon of energy for a two-step photoionization into the continuum.

FIG. 10 shows the atomic processes for a laser using one-photon autoionizing of potassium.

FIG. 11 shows the atomic processes for a laser using one-photon autoionization in rubidium.

FIG. 12 shows the atomic process for a laser in which the atomic species which absorbs the photons is the species which lases.

FIG. 13 shows a laser in which the source atomic species is excited in bulk by a microwave discharge.

DESCRIPTION OF PREFERRED EMBODIMENT

A light source in accordance with the present invention and the energy level diagram illustrating the operation is shown in FIGS. 1, 2 and 3. The source includes an evacuated envelope 11 which houses the radiating medium at suitable pressure. For example, the medium may be helium at one torr pressure in a 4 mm bore envelope. Electrodes 12 and 13 are disposed in the envelope and a voltage is applied to cause a glow discharge maintained by a small current, for example, 100 ma. A laser, preferably a tunable laser such as a dye laser provides a beam 16 which is focused by lens 17 into the evacuated envelope 11. The output beam may be recollimated by a lens 18.

The glow discharge provides a population which is stored in the metastable level of the selected species (for example, the $2s^1S$ level of He), with energy with respect to ground $\hbar\omega_2$. The tunable laser of frequency $\omega_p$ is focused to a confocal parameter equal to the desired source length L. Spontaneously emitted vacuum ultraviolet radiation at frequencies $\omega_{UV} = \omega_2 + \omega_p$ and $\omega_2 - \omega_p$ is scattered into all angles. The emitted radiation has a pulse length the same as that of the laser at $\omega_p$, and a linewidth which is the wider of the Doppler width of the $|1\rangle - |2\rangle$ transition, or of the incident laser.

To simplify and give a better physical interpretation of the formulae, we assume a three-level, non-degenerate, atomic system with non-zero matrix elements $\mu_{23}$ and $\mu_{31}$.

In the presence of the laser pump field of frequency $\omega_p$ and electric field $E_p$, the per atom (per bandwidth) spontaneous emission rate A at frequency $\omega$ may be written $$A(\omega) = \frac{\omega^3 |\mu_{13}|^2}{3\pi\hbar\epsilon_0 c^3} \left[ \sin^2\left(\frac{\mu_{23}E_p}{2\hbar\Delta\omega}\right) \right] g(\omega - \omega_{UV}) \quad (1)$$

$$= \left(\frac{\omega}{\omega_{31}}\right)^3 A_{31} \left[ \sin^2\left(\frac{\mu_{23}E_p}{2\hbar\Delta\omega}\right) \right] g(\omega - \omega_{UV})$$

The quantity $A_{31}$ is the Einstein A coefficient for spontaneous emission from level $|3\rangle$ to level $|1\rangle$. The lineshape $g(\omega - \omega_{UV})$ denotes the narrow distribution of emitted radiation centered at the frequencies $\omega_{UV} = \omega_2 \pm \omega_p$. The lineshape is the convolution of the Doppler or pressure broadened linewidth of the $|1\rangle - |2\rangle$ transition, and the linewidth of the pumping laser, and is normalized so that $\int g(\omega - \omega_{UV}) d\omega = 1$. The quantity $\alpha\omega$ is defined as $\omega_{31} - \omega_{UV}$.

The emission rate characteristic of the anti-Stokes process is described by Eq. (1). It is noted that at a given level of incident laser power that this emission rate increases as the cube of the generated frequency. A source of this type becomes inherently more efficient as the generated wavelength becomes shorter.

It is seen from Eq. (1) that if the laser pump field is adjusted so that $(\mu_{23}E_p/\hbar\alpha\omega) \to \pi$, the total emission rate per atom is $\int A(\omega)d\omega \to (\omega/\omega_{31})^3 A_{31}$. However, it will seldom be desirable to operate the light source at such high laser pump fields.

The key to optimizing the brightness of this light source is in the two-photon absorption which is created at the ultraviolet frequency $\omega_{UV}$, in the presence of the laser pump frequency $\omega_p$. The cross section for two-photon absorption at $\omega$ may be written $$\sigma(\omega) = \frac{\pi\omega |\mu_{13}|^2}{3c\epsilon_0 \hbar} \left[ \sin^2\left(\frac{\mu_{23}E_p}{2\hbar\Delta\omega}\right) \right] g(\omega - \omega_{UV}) \quad (2a)$$

$$= \frac{\pi^2 c^2}{\omega^2} A(\omega) \quad (2b)$$

We define the brightness of the light source $B(\omega)$ as the radiated power per area per steradian per bandwidth. As the depth or thickness of the source is increased, by either increasing the gas pressure, the laser pump power density, or the radius of the laser beam, the brightness $B(\omega)$ tends to be increased as a result of the increased emission, but decreased by the corresponding increase in two-photon absorption. For an infinitely long cylinder, the variation of brightness with radius r is described by $$\frac{dB(\omega)}{dr} + \sigma(\omega)(N_1 - N_2)B(\omega) = \frac{\hbar\omega A(\omega) N_2}{4\pi} \quad (3)$$

with solution $$B(\omega) = \frac{\hbar\omega A(\omega)}{4\pi\sigma(\omega)} \left(\frac{N_2}{N_1 - N_2}\right) [1 - e^{-\sigma(\omega)(N_1 - N_2)r_0}] \quad (4)$$

where $r_0$ is the outer radius of the focused (assumed cylindrical) laser beam. The total radiated power in a length L, per radian per sec of bandwidth is then $B(\omega) \times 2\pi \times 2\pi r_0 L$.

We thus obtain the interesting result that the maximum source brightness will be approached when the incident laser pump power is increased to render the media nominally two-photon opaque, i.e., $\sigma(\omega)(N_1 - N_2)r_0 = 1$. This absorption is described by Eq. (2). By two-photon absorption is meant the absorption which is created at the generated frequency due to the presence of the laser pump frequency. Thus the laser pump frequency not only causes an emission, but also causes an absorption. It is the interplay of this emission and absorption that leads to the expression for optimizing the brightness of this light source.

As the laser pump intensity is increased so as to render the media two-photon opaque, the emission of the source approaches that of a blackbody at a temperature T which is characteristic of the population of the metastable level.

It is perhaps useful to relate this result to the well-known result for the emission of a single-photon radiator. In a single-photon radiator, for example, a Na resonance pump, the density of the radiating species is increased until the media becomes nominally opaque at the radiating frequency. Once this occurs the media radiates as a blackbody at a temperature characteristic of the population of the upper level, but only over the spectral region where the media is one-photon opaque.

The results for the two-photon radiator or anti-Stokes radiator described here are quite analogous. In this case the laser pump must be increased to an intensity to render the media two-photon opaque at which time the media radiates as a blackbody, at a temperature characteristic of the population of the metastable level. It is now quite important to realize that the population of the metastable level and thus the temperature which describes it is much larger than that of a radiating level. As a result of its continual emission of radiation, the population of a radiating level is maintained at an equilibrium value significantly below that of the metastable level.

It is for this reason that the metastable level may store population and attain a population value and thus an equivalent temperature much greater than that of a continually radiating level. When the incident pumping laser is turned on this stored population may be rapidly extracted. The power density necessary to accomplish this is often much less than the $[(\mu_{23}E_p/\hbar\Delta\omega) = \pi]$ power density. Using Eq. (2b), the maximum brightness is then $$B(\omega)_{max} = \frac{1}{4\pi^3} \frac{\hbar\omega^3}{c^2} \frac{N_2}{N_1 - N_2} \quad (5a)$$

$$= \frac{1}{4\pi^3} \frac{\hbar\omega^3}{c^2} \left(\frac{1}{e^{\hbar\omega_{21}/kt} - 1}\right) \quad (5b)$$

In Eq. (5b) we have used a Boltzmann temperature T such that $N_2/N_1 = \exp - (\hbar\omega_{21}/kT)$. We recognize Eq. (5b) as simply the brightness of a blackbody at temperature T.

When the source is optically thin, for example cw where $\sigma(\omega)(N_1 - N_2)r_0 << 1$, Eq. (4) becomes $B(\omega) = [\hbar\omega A(\omega) N_2 r_0]/4\pi$. At a fixed laser power, $A(\omega) \sim 1/r_0^2$, the brightness is maximized by choosing $r_0$ as small as possible, and the total power emitted per bandwidth is invariant to $r_0$.

We now give a numerical example for storage in the $2s^1S$ level of He at 166,278 cm$^{-1}$. The pertinent parameters are the A coefficient for the $2p^1P - 1s^2\,^1S$ resonance transition, $A_- = 1.8 \times 10^9$ sec$^{-1}$; the matrix element $\mu_{23} = 2.9$ a.u.; and the Doppler width at 300° K. of the 1s-2s transition of 1.0 cm$^{-1}$.

The discharge conditions are less certain. As a benchmark for the operation of this device, we consider cw discharge conditions comparable to those of a He-Ne laser. For a 4 mm bore, 100 ma current, and 1 torr He pressure, W. Silfvast has measured a $2s^1S$ population of $9 \times 10^{11}$ atoms/cm$^3$, yielding (at 300° K.) a ratio $N_2/N_1=2.8\times 10^{-5}$. This is equivalent to a Boltzmann temperature of 22,860° K.

To minimize the requirements on laser pump power, it is desirable to tune $\omega_p$ near the 2s-2p transition frequency, but not so near that $\omega_{UV}$ is absorbed by ground state atoms. We assume a detuning of $\Delta\omega=300$ cm$^{-1}\cong 1$ Å. Thus $\omega_{UV}=585.4$ Å and $\omega_p=2.19$ μ. From Eq. (5), using $N_2/N_1=2.8\times 10^{-5}$, we calculate a maximum brightness of $4.9\times 10^{16}$ photons/sec/cm$^2$/steradian/cm$^{-1}$ of bandwidth. This emission is only present during the time the pump laser is on, and is attained only over the spectral region where the media is nominally (two-photon) opaque. From Eq. (2), the two-photon absorption cross section is $\sigma(\omega_{UV})=7.3\times 10^{-24}$ P/A cm$^2$, with P/A in W/cm$^2$. For a ground state population $N_1=3.2\times 10^{16}$ atoms/cm$^3$, and a laser beam waist of 100μ, the condition $\sigma N_1 r_0=1$ is attained at a laser power and power density of $6.8\times 10^4$ W and $4.3\times 10^8$ W/cm$^2$, respectively. For a 2 cm source length, the total emitted vacuum ultraviolet power is 0.13 W, and the efficiency of conversion from laser to VUV power is b $1.9\times 10^{-6}$.

Though the maximum power per bandwidth is determined by the ratio $N_2/N_1$, the necessary laser pump power may be reduced by simultaneously increasing $N_1$ and $N_2$. The spectral range of two-photon opacity, and thus the total emitted power, may be increased by deliberately using a broadband pump laser or (if pump power is available) by increasing $r_0$.

Using high peak power ($\sim 10^6$ W) pump sources, a total tuning range (both upper and lower sideband) of perhaps 60,000 cm$^{-1}$ should be observable. The output power will vary sharply as each of the upper np states are approached. Since vacuum ultraviolet power is linear with incident laser power, the source may also be run cw, perhaps pumped with a cw He-Xe or He-Ar gas laser, and would have a linewidth of about 1/200 of the 584 Å He resonance line.

Even for the conservative example chosen above, the brightness of this anti-Stokes source exceeds that of the He resonance line by about $10^3$. This inherent increase in brightness results from the population storage associated with the metastable level. Extension to shorter wavelengths, for example, storage in the Li+2s level at 202 Å, can be accomplished by using spark radiation to selectively photoionize innershell electrons.

It is perhaps useful to once again enumerate the properties of this light source. First, its linewidth will be the convolution, or superposition, of the linewidth of the incident laser and the linewidth of the storage level of the metastable species. Most often the metastable species will be Doppler broadened. At a wavelength of about 500 Å typical Doppler widths are about 1 cm$^{-1}$. These widths increase linearly with frequency.

As mentioned earlier, the pulsewidth of the emitting source should be that of the incident laser. Of importance, it may be substantially less than that of the radiative lifetime of the virtual p state, level 3 of FIGS. 2 and 3. For example, the radiative time of the originating level of the 584 Å line in He is about ½ nsec, while using current laser technology a source with an emission width less than 1 psec should be obtainable.

The emitted power of this radiation source will be linearly proportional to both the stored metastable population and to the pumping power of the incident laser. The emitted power will also vary as the inverse square of the detuning of the emitted frequency from the dominant virtual transition. Thus the device will operate best when tuned relatively close to this transition. The total tuning range which should be observable will be dependent on the metastable population obtainable, on the incident laser power, and on the sensitivity of the detector used.

The ability to extend the application of a source of this type to other spectral regions will be dependent on the development of methods for obtaining large metastable populations. The simple technique of operating in a glow discharge will probably not be applicable at wavelengths shorter than those obtainable using storage in ground state atoms, i.e., at wavelengths shorter than about 500 Å. Possible approaches which are applicable to shorter wavelengths are the creation of the metastable species by innershell ionization and the use of recombining plasmas to create storage in either an ionic or ground level species.

The first of these, i.e., the use of innershell ionization in Li and Li like ions is the technique followed by Mani, et al., in their paper "Lithium-Ion Soft X-Ray Laser," J. Appl. Phys. 47, 3099 (July 1976). They proposed the use of soft x-ray radiation produced by a laser plasma followed by appropriate filtering to selectively remove the inner electron of Li and thus to create an inversion between the 1s-2s upper state and the 1s$^2$S ground state of Li$^{II}$. For our present application an inversion is not required and thus the problem created by the necessary filtering will not be encountered. Similarly, the electron collisional excitation of the 1s2p state from the 1s$^2$S state, followed by the subsequent population of the ground state of Li$^{II}$ will not be a problem. As noted by Mani, et al., the general technique of stripping the innershell electron in Li like ions is applicable for the production of radiation through wavelengths into the x-ray region. For example, following Table III of Mani, et al., storage is accomplished in Li$^{II}$ at 199.3 Å, Be$^{III}$ at 100.3 Å, Ba$^{IV}$ at 60.3 Å, ... , Ne$^{IX}$ at 13.5 Å.

The following table sets forth the storage levels, obtainable wavelengths and lifetimes for lithium and lithium like ion storage:

| Ion | Storage Level | 1s2s - 1s2p Transition Wavelength | Natural Lifetime |
|---|---|---|---|
| Li$^{II}$ | 204Å | 9584Å | 5.1 × 10$^{-4}$ sec |
| Be$^{III}$ | 102Å | 6142Å | 5.5 × 10$^{-5}$ sec |
| O$^{VIII}$ | 22Å | 2447Å | 4.3 × 10$^{-7}$ sec |
| Ne$^{IX}$ | 14Å | 1853Å | 1.0 × 10$^{-7}$ sec |

A different method for creating metastable storage is that of the rapid cooling of a highly ionized plasma. See, for example, the paper by J. M. Green and W. T. Silfvast, "Population Inversions With Respect to the Ground Level of an Ion or Atom by the Rapid Cooling of a Plasma," Appl. Phys. Lett. 28, 253 (March 1976). During the course of the decay of a hot plasma the upper levels are preferentially populated and quite high storage densities may be obtained. In fact, it is speculated in the above Letter of Green and Silfvast that population inversions and thus lasing may be obtained in this way, under certain limiting conditions. Once again, for the present invention, inversion is not required.

Without going into detail, it is noted that all of the traditional existing sources of vacuum ultraviolet and soft x-ray radiation may be used as primary sources to accomplish storage in the metastable species of a device of this type. Such sources include the radiation from a low pressure spark or synchrotron radiation or the radiation of a laser produced plasma. Light from any of these sources, sometimes with filtering, may be incident on a selected media to create the metastable storage.

The probable areas of application of this device are in vacuum ultraviolet and soft x-ray spectroscopy, in the selective initiation of photochemical reactions, and as a pump source for a soft x-ray laser.

With regard to the spectroscopic applications, the unique feature is the ability to operate without the need of a vacuum ultraviolet monochromator. For this type of application the source, i.e., that is, the pumping laser, would probably be present along foci of an ellipse, with the sample located at the opposing foci. A spectrometer is shown in FIG. 4. A soft x-ray source of the type described and shown in FIG. 1 is located in an elliptical cavity 21 having a reflective wall. The source is located at one foci. The sample 22 is located at the other foci. A lense 23 focuses the light onto the monochromator.

The frequency of the emitted radiation would be known both from an original calibration of the frequency of the storage level and an on-line calibration of the frequency of the tunable pumping laser.

It may turn out that the monochromaticity of this source, which should be much greater than that obtainable, at present, in any other way, is of more importance than its tunability. For example, in various types of photoelectric spectroscopy, a source of monochromatic radiation is used to cause the emission of innershell electrons. The energy with which these electrons are emitted is measured, the pertinent energy levels of the species thereby determined. The resolution of such an instrument can only be as good as that of the primary source of electromagnetic radiation.

FIG. 5 shows the light source in another spectrometer configuration. The light source is shown including an elongated narrow bore evacuated envelope 11a which contains the radiating medium. A coil 25 provides excitation of the ground state atoms to raise them to a metastable level. A tunable laser provides a laser beam 16a which causes spontaneous anti-Stokes scattering from the metastable atomic species to provide high intensity light by anti-Stokes scattering. Light which is incident upon the walls of the envelope 11a at relatively small grazing angles as, for example, two degrees or less, bounces off the walls and continues down along the elongated envelope. The radiation which makes a larger angle than the grazing incident angle is either transmitted through the walls of the envelope or absorbed thereby with only the grazing incident light continuing down along the envelope. A cold trap is formed by a region in the same or in an adjacent envelope containing unexcited atoms of the radiating medium. The cold gas trap receives the grazing light from the source region and absorbs incident radiation at the resonance lines of the atomic species allowing light at narrow wavelengths corresponding to the anti-Stokes wavelength to emerge from the trap. The emerging light is then directed onto a sample and detected by a detector to thereby provide a spectrometer. By way of example, in a light source operating with helium, a helium trap may be employed which strongly absorbs radiation at 584 Å and 537 Å, as well as higher resonance lines. Resonance line is used herein to mean any atomic transition which occurs to ground. The function of the cold trap as previously described is to absorb the resonance line radiation and thus perhaps to make it possible to use the light source for spectrographic applications without the need of a monochromator. In the example shown, the light source, gas trap and sample regions are independent. By making the regions independent, the cold gas trap atomic medium and the light source atomic medium may be at different pressures. However, the assembly can operate with a single envelope with the regions being separated from one another by the fact that the region adjacent the coil is the excited region, while the adjacent region is unexcited. As stated above, the detector may or may not include a monochromator, depending upon the spectrum of the light leaving the cold gas trap.

Other applications may result from the short pulse feature of this type of light source. One such application could be in the area of time of flight photoelectric spectroscopy.

The possible application of this light source as a pump for an x-ray laser is of great interest. An x-ray laser constructed along the lines of the proposal of M. A. Duguay and P. M. Rentzepis, Appl. Phys. Lett. 10, 350 (1967), involves a light source capable of rapidly ionizing an innershell electron of a selected species, thereby immediately creating an inversion of the produced ion.

Of particular importance, the light source or flashlamp for this application must have a pulsewidth which is no longer than the spontaneous emission time of the selected ion. If the flashlamp has a rise time which is slower than this then excited ions produced during the early part of the pulse will spontaneously decay, thus preventing the attainment of an inversion. As we have noted earlier, the source described here is a particularly convenient means of producing a light pulse of short duration.

A 585 Å light source, as is described, is of appropriate wavelength to ionize the innershell electron of Rb, and thereby to create gain on the $4p^5s$–$4p^6$, 697 Å transition of $Rb^+$. Calculations show that a gain of $e^{10}$ requires a 1 mm path length and an inversion of $4.6 \times 10^{11}$ atoms/cm$^3$ of the $Rb^+$.

For this application of x-ray laser pumping source 26, FIG. 6 of a length of 1 m, or perhaps longer is employed. The incident pumping laser would be periodically refocused by lens 27 every several cm, thereby allowing it to maintain a small beam waist and the highest possible brightness. If possible, the anti-Stokes source would be placed at one foci of an ellipse with the proposed lasing sample as the alternate foci.

The light source which causes photoionization is shown as separate from the short wavelength rubidium laser which is being pumped. Thus, the helium atoms which comprise the flashlamp or radiation source atom species are separated from the rubidium atoms which form the lasing species.

To avoid the inefficiencies of short wavelength optics, it may be preferred to mix the target or lasing atomic species directly with lamp or source atomic species. For example, the lasing atomic species, potassium (K) or rubidium R6, can be included directly in the same envelope as the helium (He) lamp species. For example, we may vaporize K or Rb directly into the He. The concentrations of the two species are preferably adjusted so that the single-photon absorption cross section of the species which is to lase, i.e., the K or Rb, exceeds the two-photon absorption cross section of the "lamp media" itself. In this manner the blackbody limitation on the intensity of the anti-Stokes flashlamp may be overcome. That is, photons which are emitted by the, for example, He, are immediately absorbed by the, for example, K, and are thus not reabsorbed by the He. FIG. 7 shows the mixed atomic species configuration in envelope 31. The concentration of helium atoms is about $10^{19}$ atoms/cm$^3$ with $10^{15}$ atoms/cm$^3$ of K. An electrical discharge means is indicated schematically by the loops of wire 32. The discharge would heat or excite both atomic species. In general, the lamp species, i.e., the He, is maintained optically thick so that it comes into thermal equilibrium with the hot electrons. On the other hand, the K would probably be allowed to remain optically thin and therefore cool. Incident tunable visible or infrared light 33 is applied along the bore of the envelope causing spontaneous anti-Stokes scattering. Photons would be emitted from the He, and immediately absorbed by the K. As per the energy diagrams to be described, lasing occurs in the K+ ion to provide short wavelength light 34.

The atomic processes and operation of the device of FIG. 7 can be more clearly understood from the following description of three embodiments of short wavelength lasers employing radiation sources in accordance with the invention and preferably intermixed atomic lamp and atomic lasing species.

Referring to FIG. 8, the atomic processes in a laser which operates by direct photoionization into the continuum is schematically illustrated. The left two columns of this figure show energy levels of the neutral atomic species K. The right-hand column shows select levels of the desired atomic species K+. Radiation from the helium is applied at a frequency (or energy) 36 which is sufficiently high to cause photoionization of an innershell ($3p^6$) electron. For the case of this figure, the energy of the incident photon 36 must be greater than 201,471 cm$^{-1}$ (thus its wavelength must be shorter than 496 Å). Duguay points out that though energy applied at such a short wavelength will cause photoionization of both inner and outer shell electrons, that the cross section for photoionization of the innershell electron will be perhaps 20 times larger than that of the outer shell electron and will thus dominate.

The excited state K+ ion thus produced ($3p^54s$) will then lase 37 to its ground state. For the case shown here such lasing will occur at 601 Å.

The technique of direct photoionization to the continuum is perhaps the most straightforward and requires the least detailed knowledge of the spectra of the atomic species. However, the cross section for absorption of an incident laser photon for ionization into the continuum of the innershell electron is probably no larger than $10^{-18}$ cm$^2$. If we assume a ground state K density of $10^{15}$ atoms/cm$^3$, then at this cross section a path length of $10^3$ cm is required to approximately absorb all of the anti-Stokes light.

The direct photoionization technique does not exploit one of the key properties of the anti-Stokes source which is its narrow bandwidth. For the direct photoionization technique the energy of the pumping photon need only be greater than that of the innershell ionization potential, and its bandwidth is of no importance.

It is preferable to raise the absorption cross section for the incident anti-Stokes photon and this can be done by utilizing the narrow bandwidth of the source.

One approach of increasing the absorption cross section of the neutral species is shown by the dotted line 38 in the center of FIG. 8. Here, the anti-Stokes source is tuned to a discrete innershell transition of the neutral K species, for example, the $3p^64s$–$3p^54s4d$ transition at 172,732 cm$^{-1}$. A second photon of energy sufficiently great to reach the continuum is then applied (for this example the second photon would have to have an energy greater than 28,739 cm$^{-1}$) or wavelength shorter than 3470 Å. The second photon can be applied by a laser operating at this latter wavelength. A mixed atomic species configuration including a laser photon source 38 for providing the second photon is shown in FIG. 9. All other reference numerals identify parts described in connection with FIG. 6.

The innershell transition at 172,732 cm$^{-1}$, seen by the anti-Stokes photon, will have an absorption cross section of about $10^{-14}$ cm$^2$, thus solving the problem of absorbing this photon in a small distance. Though the absorption cross section for the second photon at 28,739 cm$^{-1}$ will remain low, the efficiency of the utilization of the incident laser energy at this frequency is not of importance.

There is a problem with this technique which must be discussed. Once energy is deposited into the $3p^54s4d$ level, the atom will tend to decay by an autoionizing process into the ground state ($3p^6$) ion. An autoionizing process is one where an electron drops down and another flies off. For example, for this case, the 4s electron can drop down to fill the $3p^6$ shell, while in the process throwing off the 4d electron. The net result is a $3p^6$ ion.

To overcome this problem it is necessary that the intensity of the laser radiation at the frequency of the second photon (28,739 cm$^{-1}$) be sufficiently great to cause the rate of photoionization to the continuum to be greater than the rate of autoionization.

One approach to accomplishing the above-stated condition is to utilize a higher innershell transition for the first photon. It is quite well known that, for high n, the autoionizing rates of innershell transitions vary inversely as $n^3$. Furthermore, if the frequency of the second photon is reduced as that of the first photon is increased, i.e., such that their sum energy remains constant, then the transition rate to the continuum caused by the second photon will also be increasing. Thus, the ratio of direct photoionization to that of autoionization will increase both because the photoionization rate is increasing, and because the autoionizing rate is decreasing. Considerable study will be necessary.

We also note that this technique need not be limited to two photons. It might well be advisable to hit a discrete level with the first (anti-Stokes) photon and then to use several visible or near UV photons to complete the photoionization process.

It is also possible to operate where the first (anti-Stokes) photon does not exactly hit a discrete level. The first photon (the anti-Stokes photon) causes a virtual excitation of the K. The additional photons attempt to carry this virtually excited state into the continuum, while the competitive autoionizing process attempts to throw off an electron and create the ground state ion.

The potential advantage of such a virtual process is that it may be desirable to operate the anti-Stokes source at some particular wavelength where it is particularly efficient (for example, near 584 Å or 537 Å). The increase of production of anti-Stokes light thereby obtained might allow some reduction in the efficiency of the absorption process. The ratio of ionization to the continuum as compared to autoionization will remain unchanged, at least for small detunings, from the target state.

The absorption cross section can be increased while utilizing the autoionizing process by the method shown schematically in FIG. 10. In this technique radiation is applied at a frequency which hits an innershell transition with sufficient energy that it is capable of autoionizing into an excited state ion. In FIG. 10 we arbitrarily select an energy level at 198,911 cm$^{-1}$. This is above the series limit of the 3p$^5$4s ion at 198,247 cm$^{-1}$, and thus there should be a reasonable probability of autoionizing into that state.

This same type of one-photon autoionizing process is shown again, this time for Rb, in FIG. 11. These Rb levels are of interest since they lie in the vicinity of high efficiency operation of the anti-Stokes source.

If a state with high branching ratio to a select ionic state can be determined, this one-photon autoionizing process may be very attractive. One might estimate an absorption cross section for the initial photon in the vicinity of $10^{-15}$ cm$^2$ for such high lying autoionizing states.

In each of the above examples the photon of the anti-Stokes flashlamp was absorbed by a neutral species, for example, potassium or rubidium, which then produced an excited state of the ionic species of the same element, for example, K$^+$ or Rb$^+$. This latter species, i.e., K$^+$ or Rb$^+$, would then lase.

However, there are many examples where the species which absorbs the photon will be the same species which lases. One of these is shown in FIG. 12. Here we see energy stored in the 2s metastable state of atomic hydrogen at 82,258 cm$^{-1}$. An incident photon at 4868 Å causes the generation of anti-Stokes radiation at the sum energy of about 102,800 cm$^{-1}$. This radiation is absorbed by the Xe$^+$ ion which may then lase to a lower state of this same ion at 1083 Å. That is, the anti-Stokes source is tuned such that the energy of the generated photon coincides exactly with that of the absorptive transition of the target species. Lasing then takes place within the target species itself. This is contrasted with the case of potassium where the photon was absorbed by neutral potassium and lasing took place in the K$^+$ ion.

There could be many other examples of the type just discussed. In general, species will be chosen such that their ionization potentials will be comparable and thus in the discharge both will exist in reasonable quantities. For example, hydrogen ionizes at about 13.6 eV, while Xe ionizes at 12.1 eV. Thus, in a discharge, there will exist appreciably equal quantities of Xe$^+$ and ground state hydrogen.

FIG. 13 shows a lasing system including a microwave discharge 41 for exciting metastable atoms with a magnetic field for improving the excitation and confining the plasma. Visible radiation 42 is introduced by a laser and 1038 Å laser radiation emerges. The two atomic species are contained in a ridged waveguide 43 with the plasma confined at the ridges 44 by the magnetic field created by the coil 46.

Thus, there has been provided a vacuum ultraviolet source which provides high brightness narrowband tunable light. The source can be operated with a pulsewidth of less than ½ nsec. The source is simple in construction and relatively compact. There has also been provided a short wavelength laser which is pumped by photons from the vacuum ultraviolet source. Although the discussion has been with respect to vacuum ultraviolet the principles discussed are applicable to radiation in other regions of the electromagnetic spectrum and particularly the soft x-ray and hard x-ray regions. What is claimed is:

1. A vacuum ultraviolet and x-ray high intensity light source comprising an envelope, a radiating medium including a large number of atoms initially at ground state capable of storing energy at a metastable level at a predetermined pressure uniformly distributed throughout said envelope, the characteristic frequency of said atoms in said metastable level being defined as $\omega_2$, means for exciting the ground state atoms in said envelope to form a region in said envelope containing excited metastable atoms at a metastable level, and a laser source for introducing a beam of laser energy into said envelope at a frequency defined as $\omega_p$, said laser energy causing spontaneous anti-Stokes scattering from the atomic population stored in said metastable level at a radiating frequency $\omega_{UV}$ equal to $\omega_2 \pm \omega_p$ to provide high intensity light at said frequency $\omega_{UV}$.

2. A vacuum ultraviolet and x-ray high intensity light source as in claim 1 wherein said ground state atoms are helium atoms.

3. A vacuum ultraviolet and x-ray high intensity light source as in claim 1 wherein said atoms are lithium atoms or lithium like ions having a metastable level at 1s2s.

4. A vacuum ultraviolet source as in claim 1 wherein said laser is a tunable laser.

5. A vacuum ultraviolet source as in claim 4 wherein said laser is tunable over a frequency range near the frequency $\omega_2$.

6. A vacuum ultraviolet source as in claim 1 wherein said envelope is elongated and said laser provides an intense beam of energy along said envelope.

7. A vacuum ultraviolet source as in claim 1 wherein said laser is a pulsed laser to provide pulses of high intensity light.

8. The method of generating ultraviolet and x-ray high intensity radiation at frequency $\omega_{UV}$ which comprises the steps of providing a radiating medium including a large number of substantially uniformly distributed atoms at ground state, said atoms being capable of storing energy at a metastable level corresponding to a frequency $\omega_2$, exciting said ground state atoms to cause a large number of atoms to be excited from said ground state to said metastable level, with said excited atoms being substantially uniformly distributed in said medium, impinging a beam of energy into said medium at a pump frequency $\omega_p$ at power sufficient to cause spontaneous anti-Stokes scattering from the atoms at the metastable level along said beam stored at a frequency $\omega_{UV}$ equal to $\omega_2 \pm \omega_p$ to provide the high intensity radiation at said frequency.

9. The method of generating ultraviolet and x-ray radiation at frequency $\omega_{UV}$ as in claim 8 in which the pump power and density of ground state atoms are selected to render the medium two-photon opaque.

10. The method of generating ultraviolet and x-ray radiation at frequency $\omega_{UV}$ as in claim 8 in which the pump frequency $\omega_p$ is a broadband frequency.

11. The method of generating ultraviolet and x-ray radiation at frequency $\omega_{UV}$ as in claim 8 in which the energy at frequency $\omega_p$ is provided by a tunable laser.

12. The method of generating ultraviolet and x-ray radiation at frequency $\omega_{UV}$ as in claim 8 in which the energy provided to said medium at frequency $\omega_p$ is pulsed energy to permit a large population of atoms to be stored before spontaneous anti-Stokes scattering is triggered to provide pulsed radiation at frequency $\omega_{UV}$.

13. A vacuum ultraviolet and soft x-ray light source comprising an envelope, a uniformly distributed radiating medium containing uniformly distributed ground state atoms capable of storing energy at a metastable level with a characteristic first frequency, means for causing a large number of said ground state atoms in said radiating medium to be excited to said metastable level, and means for introducing energy into said medium at a second frequency, said energy being of sufficient amplitude to cause anti-Stokes scattering from said atoms at said metastable level at a frequency equal to said first frequency plus and minus said second frequency.

14. A vacuum ultraviolet and soft x-ray source as in claim 13 in which said means for causing said medium to store energy at said metastable level comprises means for causing a glow discharge in said medium.

15. A vacuum ultraviolet and soft x-ray source as in claim 14 in which said means for introducing energy at said second frequency comprises a laser.

16. A vacuum ultraviolet and soft x-ray light source as in claim 13 in which said energy at said second frequency is of an amplitude which renders the medium two-photon opaque so that the source attains the blackbody temperature of the metastable level.

17. A vacuum ultraviolet and soft x-ray light source as in claim 13 in which said envelope is long and in which said means for introducing energy at said second frequency comprises a laser focused to a confocal parameter equal to the desired source length.

18. A vacuum ultraviolet and soft x-ray light source assembly comprising an elongated eliptical reflector, a light source as in claim 17 disposed at one foci of said reflector and means adopted to be radiated by said light disposed at the other foci of said reflector.

19. An x-ray laser comprising an envelope containing an atomic species capable of being inverted with respect to a ground state and a pump source for causing said inversion comprising an envelope, a radiating medium containing ground state atoms capable of storing energy at a metastable level with a characteristic frequency, means for causing a large number of said generated state atoms to be excited to said metastable level, and means for introducing energy into said medium at a second frequency, said energy being of sufficient amplitude to cause anti-Stokes scattering from said atoms at said metastable level at a frequency equal to said first frequency plus and minus said second frequency whereby to invert the laser atoms with respect to ground to cause lasing of said laser.

20. A laser comprising an envelope containing a lasing atomic species, means for exciting the lasing atomic species including a source of high intensity light source comprising an envelope, a radiating medium including a large number of atoms initially at ground state capable of storing energy at a metastable level at a predetermined pressure distributed throughout said envelope, the characteristic frequency of said atoms in said metastable level being defined as $\omega_2$, means for exciting said atoms in said envelope to form a region in said envelope containing excited metastable atoms at a metastable level, and a laser source for introducing energy into said envelope at frequency $\omega_p$, said laser energy causing anti-Stokes scattering from the atomic population stored in said metastable level at a radiating frequency $\omega_{UV}$ equal to $\omega_2 \pm \omega_p$ to provide the high intensity light energy to said lasing atomic species whereby the excited lasing atomic species lases.

21. A laser as in claim 20 in which the lasing atomic species and the light atomic species are intermixed in the same envelope.

22. A laser as in claim 20 in which the lasing atoms are additionally excited by a second laser source whereby the lasing atoms are excited in a two step process.

23. A laser as in claim 22 wherein the lasing atomic species and the light source atomic species are in the same envelope.

24. A laser as in claim 20 in which the lasing atomic species is a neutral species excited to the ionic species of the same atom.

25. A laser as in claim 21 in which the lasing atomic species is a neutral species excited to the ionic species of the same atom.

26. A laser as in claim 22 in which the lasing atomic species is a neutral species excited to the ionic species of the same atom.

27. A laser as in claim 23 in which the atomic species is a neutral species excited to the ionic species of the same atom.

28. A laser as in claim 21 in which the lasing atomic species is potassium.

29. A laser as in claim 21 in which the lasing atomic species is rubidium.

30. A laser as in claim 21 in which the lasing species is the same species as that which is excited.

31. A vacuum ultraviolet and x-ray high intensity light source comprising an elongated envelope, a radiating medium including a large number of atoms initially at ground state capable of storing energy at a metastable level at a predetermined pressure uniformly distributed throughout said envelope, the charateristic frequency of said atoms in said metastable level being defined as $\omega_2$, means for exciting the ground state atoms in said envelope to form a region in said envelope containing excited metastable atoms at a metastable level, and a laser source for introducing a beam of laser energy into said envelope at a frequency defined as $\omega_p$, said laser energy causing spontaneous anti-Stokes scattering from the atomic population stored in said metastable level at a radiating frequency $\omega_{UV}$ equal to $\omega_2 \pm \omega_p$ to provide high intensity light at said frequency $\omega_{UV}$, and a cold gas trap disposed to receive radiation from one end of said envelope.

* * * * *